United States Patent
Liu et al.

(10) Patent No.: US 9,760,932 B2
(45) Date of Patent: Sep. 12, 2017

(54) ATTRIBUTE RANKING BASED ON MUTUAL INFORMATION

(71) Applicant: eBay Inc., San Jose, CA (US)

(72) Inventors: Ming Liu, San Jose, CA (US); Ying Xuan, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 808 days.

(21) Appl. No.: 14/081,138

(22) Filed: Nov. 15, 2013

(65) Prior Publication Data

US 2014/0365338 A1    Dec. 11, 2014

Related U.S. Application Data

(60) Provisional application No. 61/832,711, filed on Jun. 7, 2013.

(51) Int. Cl.
*G06Q 30/00* (2012.01)
*G06Q 30/06* (2012.01)

(52) U.S. Cl.
CPC ................ *G06Q 30/0627* (2013.01)

(58) Field of Classification Search
CPC ........ G06Q 10/00; G06Q 30/00; G06F 15/00; G06F 17/30
USPC .................................................. 705/3, 27.2
See application file for complete search history.

(56) References Cited

U.S. PATENT DOCUMENTS

| | | | |
|---|---|---|---|
| 7,107,192 B1* | 9/2006 | Cung ...................... | G06F 17/18 382/224 |
| 2004/0143600 A1* | 7/2004 | Musgrove ......... | G06F 17/30864 |
| 2008/0033939 A1* | 2/2008 | Khandelwal ...... | G06F 17/30707 |
| 2009/0228233 A1* | 9/2009 | Anderson .............. | G06Q 10/10 702/127 |
| 2010/0174557 A1* | 7/2010 | Bundschus ............ | G06Q 10/00 705/3 |
| 2012/0005044 A1* | 1/2012 | Coleman ................ | G06Q 30/02 705/27.2 |

* cited by examiner

*Primary Examiner* — Rokib Masud
(74) *Attorney, Agent, or Firm* — Schwegman Lundberg & Woessner, P.A.

(57) ABSTRACT

Techniques for ranking the importance of various attributes associated with various product categories are described. According to various embodiments, product category information identifying various products in a particular product category in the inventory of a marketplace website is accessed. The product category information may further identify a set of attributes associated with the products in the particular product category. An importance value associated with each of the attributes is then calculated, the importance values indicating an importance of each of the attributes for uniquely identifying the products in the product category. Thereafter, each of the attributes are ranked, based on the importance value associated with each of the attributes.

12 Claims, 12 Drawing Sheets

| PRODUCT CATEGORY | ATTRIBUTES |
|---|---|
| GPS | Brand<br>Model<br>Storage Size<br>Display size<br>Type<br>Brand<br>Color<br>... |
| Computer | CPU<br>Memory<br>Hard Disk Space<br>Display Size<br>Wi-fi capability<br>Graphics Processor<br>... |
| ... | ... |

*Fig. 2*

| PRODUCT CATEGORY | PRODUCT ID | PRODUCT ATTRIBUTES | | | |
|---|---|---|---|---|---|
| | | BRAND | MODEL | COLOR | TYPE | ... |
| GPS | 1 | Garmin | Nuvi 650 | Black | Car | |
| | 2 | : | Nuvi 2455LMT | : | : | |
| | 3 | : | Nuvi 1300LMT | | | |
| | 4 | : | Nuvi255w | | | |
| | 5 | : | Nuvi 1490T | | | |
| | 6 | Magellan | StreetPilot C340 | | | |
| | 7 | : | Roadmate 1400 | | | |
| | 8 | : | eXplorist GC | | | |
| | 9 | : | Maestro 3250 | | | |
| | 10 | : | Maestro 4250 | | | |
| | 11 | Tomtom | GO 700 | | | |
| | 12 | : | GO 2535 | | | |
| | 13 | : | GO 2405 | | | |
| | 14 | : | VIA 1500 GPS | | | |
| | 15 | : | ONE 125 | | | |

*Fig. 3*

GENERATE ITEM LISTING

Please specify product category

Computer

Please specify model
- Model 1 ✓
- Model 2
- Model 3
...

Please specify display size
- Display Size 1
- Display Size 2 ✓
- Display Size 3
...

Please specify CPU
- CPU 1
- CPU 2
- CPU 3 ✓
...

Based on your specified values, are you trying to sell this product?

XYZ Computer

Yes    No

ATTRIBUTE RANKING BASED ON MUTUAL INFORMATION

CROSS-REFERENCE TO RELATED APPLICATIONS

This application claims the benefit of U.S. Provisional Application No. 61/832,711, filed Jun. 7, 2013, entitled "ATTRIBUTE RANKING BASED ON MUTUAL INFORMATION," which is incorporated herein by reference in its entirety.

TECHNICAL FIELD

The present application relates generally to data processing systems and, in one specific example, to techniques for ranking the importance of various attributes associated with various product categories.

BACKGROUND

Conventional e-commerce websites allow shoppers to browse through a wide variety of items available for sale online. Each e-commerce website typically hosts multiple item listing webpages that offer various items for sale. Moreover, each e-commerce website generally maintains its own product inventory and its own product category structure.

BRIEF DESCRIPTION OF THE DRAWINGS

Some embodiments are illustrated by way of example and not limitation in the figures of the accompanying drawings in which:

FIG. 2 illustrates an example of product category information, according to various embodiments;

FIG. 3 illustrates an example of product category information, according to various embodiments;

FIG. 10A illustrates an exemplary portion of a user interface, according to various embodiments;

FIG. 10B illustrates an exemplary portion of a user interface, according to various embodiments;

DETAILED DESCRIPTION

Example methods and systems for ranking the importance of various attributes associated with various product categories are described. In the following description, for purposes of explanation, numerous specific details are set forth in order to provide a thorough understanding of example embodiments. It will be evident, however, to one skilled in the art that the present invention may be practiced without these specific details.

According to various exemplary embodiments, an attribute ranking system is configured to rank the importance of various attributes. For example, in some embodiments, a set of attributes associated with a given product category may be ranked based on the importance of each of the attributes, where importance may be defined in various ways. A non-limiting example of a definition of importance is the ability to uniquely identify products in a product category. Accordingly, in accordance with various embodiments described herein, an attribute ranking system may rank attributes in a product category based on how well such attributes tend to uniquely identify the products in that product category.

Figure 1:
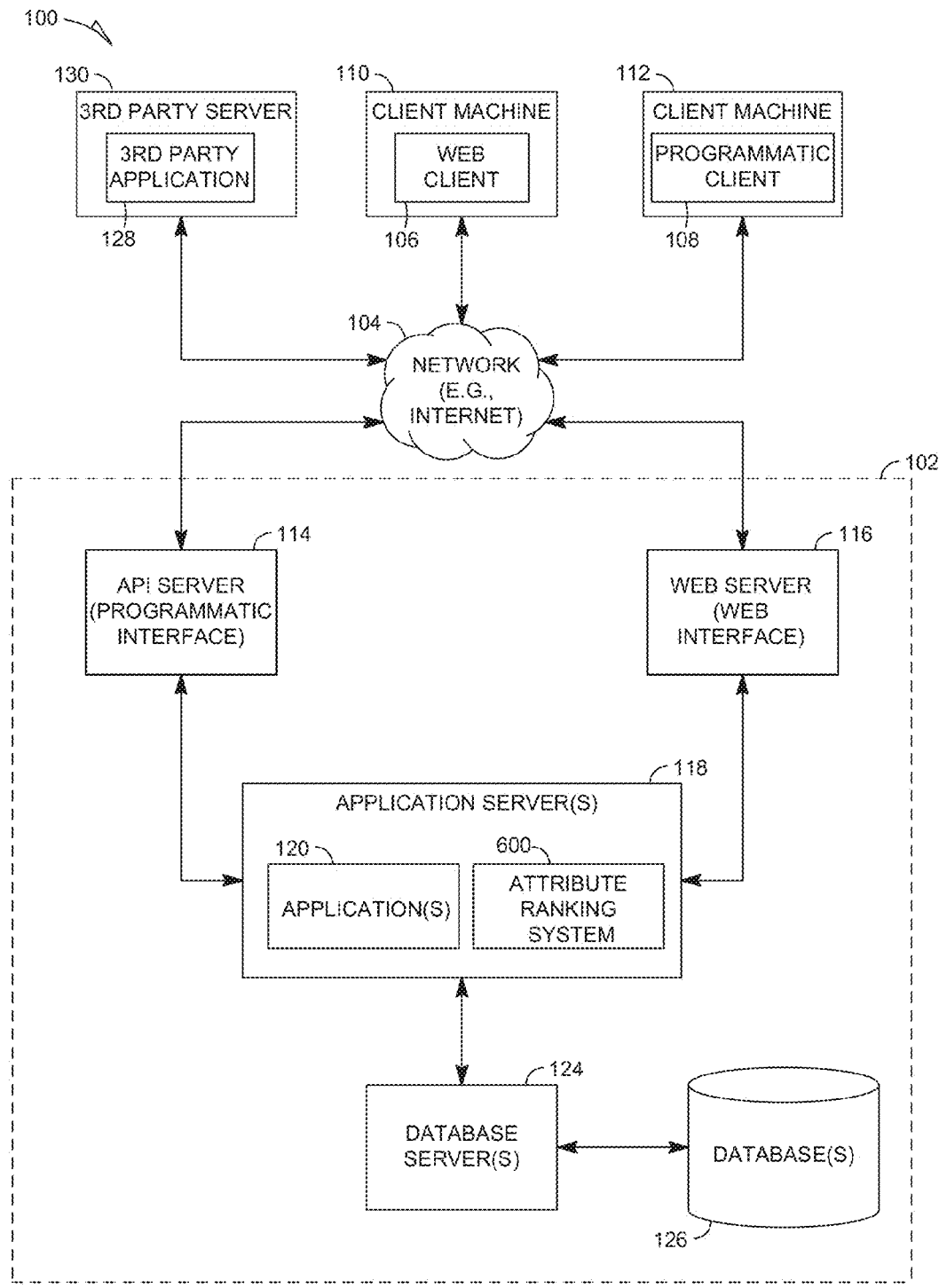
FIG. 1 is a network diagram depicting a client-server system, within which one example embodiment may be deployed.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various exemplary embodiments, the applications 120 may be implemented on or executed by one or more of the modules of the attribute ranking system 600 illustrated in FIG. 2. While the applications 120 are shown in FIG. 1 to form part of the networked system 102, it will be appreciated that, in alternative embodiments, the applications 120 may form part of a service that is separate and distinct from the networked system 102. With some embodiments, the application servers 118 hosts what is referred to herein as an attribute ranking system 600. The 600 is described in more detail below in conjunction with FIG. 2.

Further, while the system 100 shown in FIG. 1 employs a client-server architecture, the present invention is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Consistent with various embodiments, a retailer or online marketplace (such as eBay® or Amazon®) may sell a wide range of product items, and may maintain product category structure that identifies the various product items available for sale. More specifically, the product category structure may identify various product categories (e.g., computers, electronics, collectibles, art, toys, books, GPS, etc.) and different types of products in each of these categories. For example, in the product category of GPS, examples of products include the Garmin Nuvi 650, the Tomtom GO 700, and so on. Product category information describing such a product category structure may be stored electronically in a database (e.g., as a data structure or data table included in a database). The product category structure may correspond to an extensive online library of product information and images for use by sellers when they list their items.

Consistent with various embodiments, each product category in a product category structure of a marketplace website may be associated with a particular set of attributes. As described throughout, attributes may include, for example, any properties, features, qualities, characteristics, settings, options, and so on, that may be associated with various products or product items. Accordingly, the attributes associated with a given product category may describe various possible attributes of the product items in that given product category. Typically, the aforementioned product attributes associated with a given product category will be defined in the product category structure in association with that product category. In some embodiments, it is also possible that each product in a product category may be associated with its own particular set of attributes.

For example, FIG. 2 illustrates an exemplary portion of product category information 200 describing a product category structure associated with a marketplace website such as eBay®. The product category information 200 may be stored in a data structure such as a data table. The product category information 200 identifies various product categories including "GPS" and "Computer" and, for each of the categories, various product attributes associated with products in that product category. For example, for the category of "GPS", the product category information 200 may define attributes such as brand, model, storage size, display size, type, brand, color, and so on. As another example, for the product category of "Computers", the product category information 200 may define attributes such as CPU, memory, hard disk space, display size, Wi-Fi settings, graphics processor, operating system, and so on.

Figure 6:
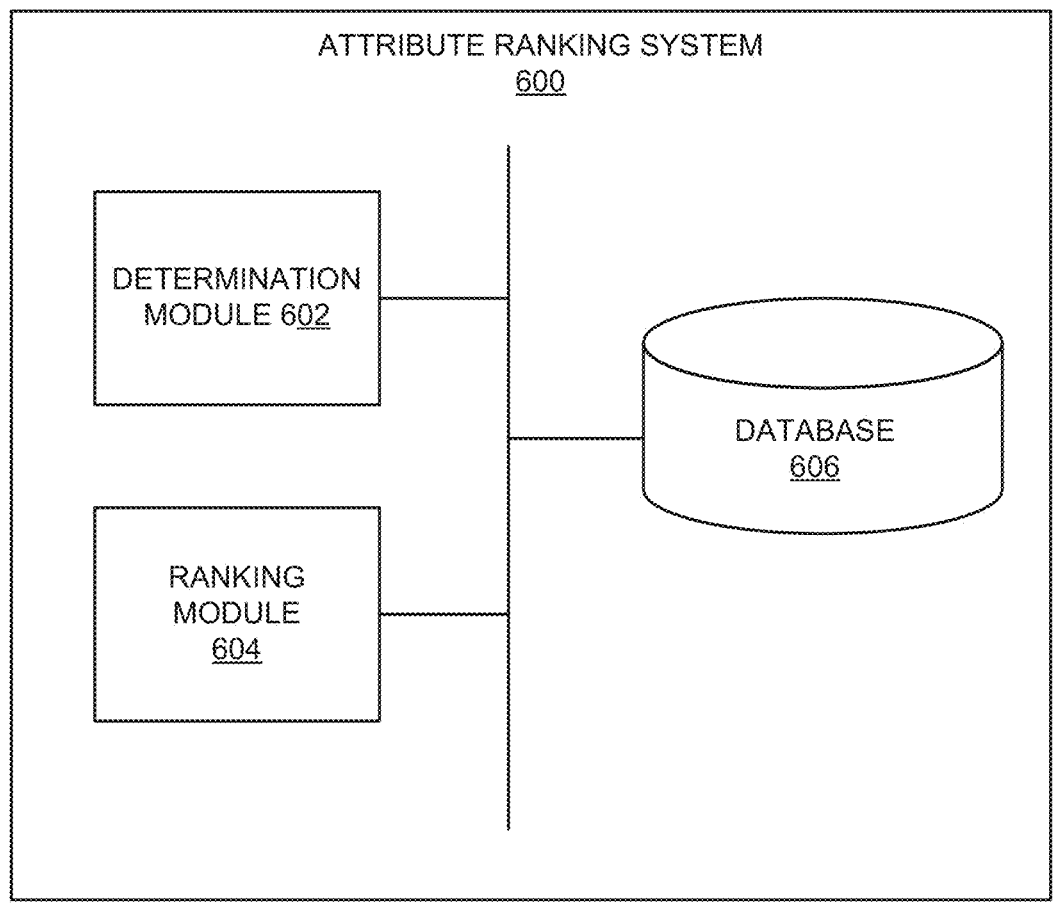
FIG. 6 is a block diagram of an example system, according to various embodiments.

According to various exemplary embodiments, an attribute ranking system, such as attribute ranking system 600 in FIG. 6, ranks the importance of all available attributes for each product category in a product category structure. More specifically, the attribute ranking system may rank the importance of the attributes based on how well they tend to uniquely identify products in that product category. For example, the importance of an attribute in a given product category may correlate to the following: given a value of the attribute for a specific product item in the given product category, how easy is it to determine the identity (e.g., the product ID) of the specific product item. Accordingly, given all the different products in a given product category (each with their own unique product IDs, such as eBay® product IDs or epids), the attribute ranking system 600 may identify the attributes for that category that have the greatest degree of variation, entropy, or distribution in value among the products. In other words, the attribute ranking system 600 may identify the attributes for that category that tend to uniquely identify each of the products in that category, or that correlate to each of the product IDs or epids in that category.

For example, FIG. 3 illustrates an exemplary portion of product category information 300 stored in the form of a data structure, such as a data table. The product category information 300 identifies a particular product category, such as GPS, and identifies each of the particular products in that product category (e.g., by product ID or epid). The product category information 300 also identifies, for each particular product, the attribute value of various attributes, such as brand, model, color, type, and so on.

Figure 4:
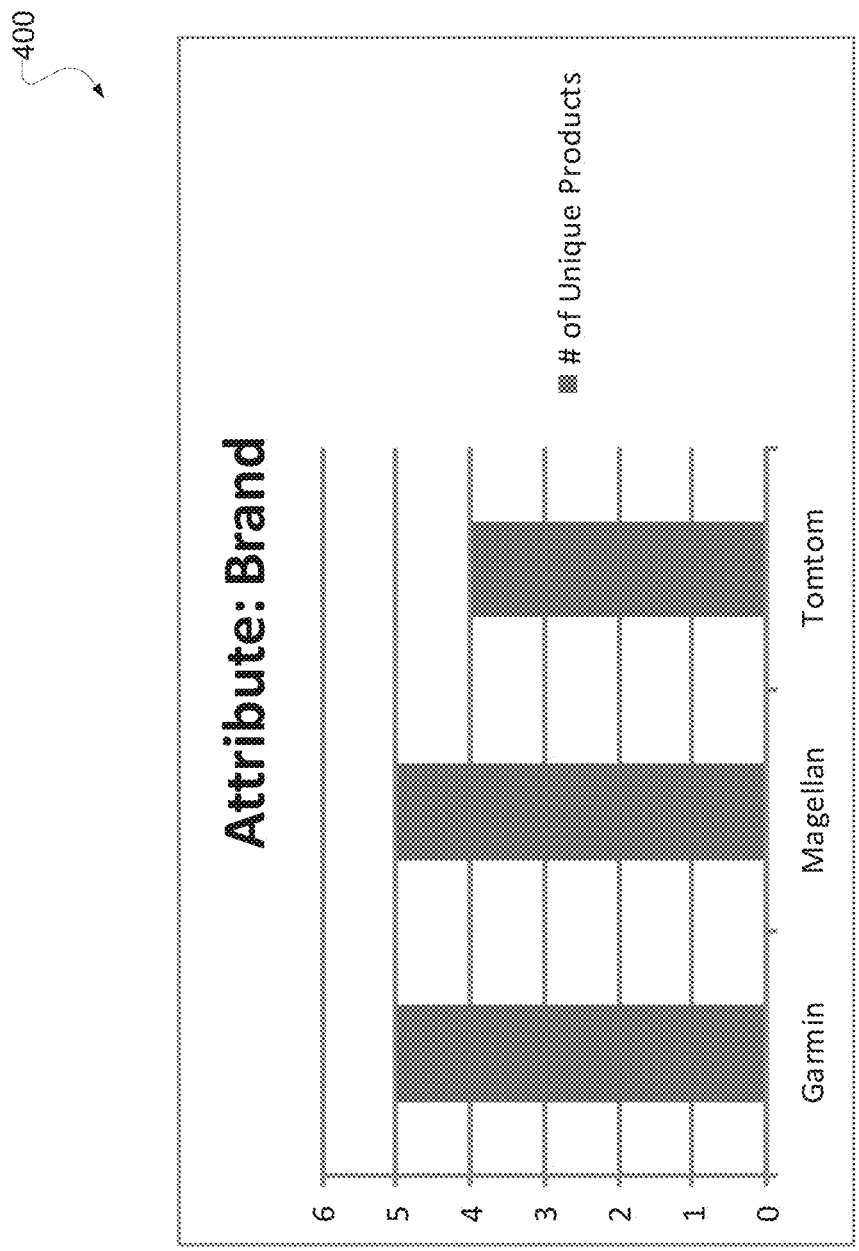
FIG. 4 illustrates an example of a histogram, according to various embodiments.

As illustrated in FIG. 3, most products in the GPS product category may be associated with one of a small set of brands, such as "Garmin", "Magellan", and "Tomtom". For example, FIG. 4 illustrates a histogram 400 of the number of unique products in the product category of GPS that are associated with a given brand attribute, such as the number of unique products associated with the brand attribute "Carmen", "Magellan", and "TomTom". As illustrated in FIG. 4, many of the products in this category share similar brands, such that the knowledge of the brand of a product item is only somewhat helpful in identifying the product item. As another example, most products in the GPS product category may be associated with a similar type attribute, such as "Car" or "Handheld". As another example, most products in the GPS product category may be associated with similar color attributes, such as "black" or "grey". Accordingly, the attributes of brand, type, and color do not have a high degree of variation, entropy, or distribution in value among the products in the GPS product category, since a large number of products in the GPS product category share similar brands, colors, and types. Accordingly, the attributes of brand, type, and color do not tend to uniquely identify each of the products in that product category (e.g., they do not tend to correlate to each of the epids in that product category). Thus, an attribute ranking system may assign a lower importance ranking to the attributes of brand, type, and color, for this product category.

Figure 5:
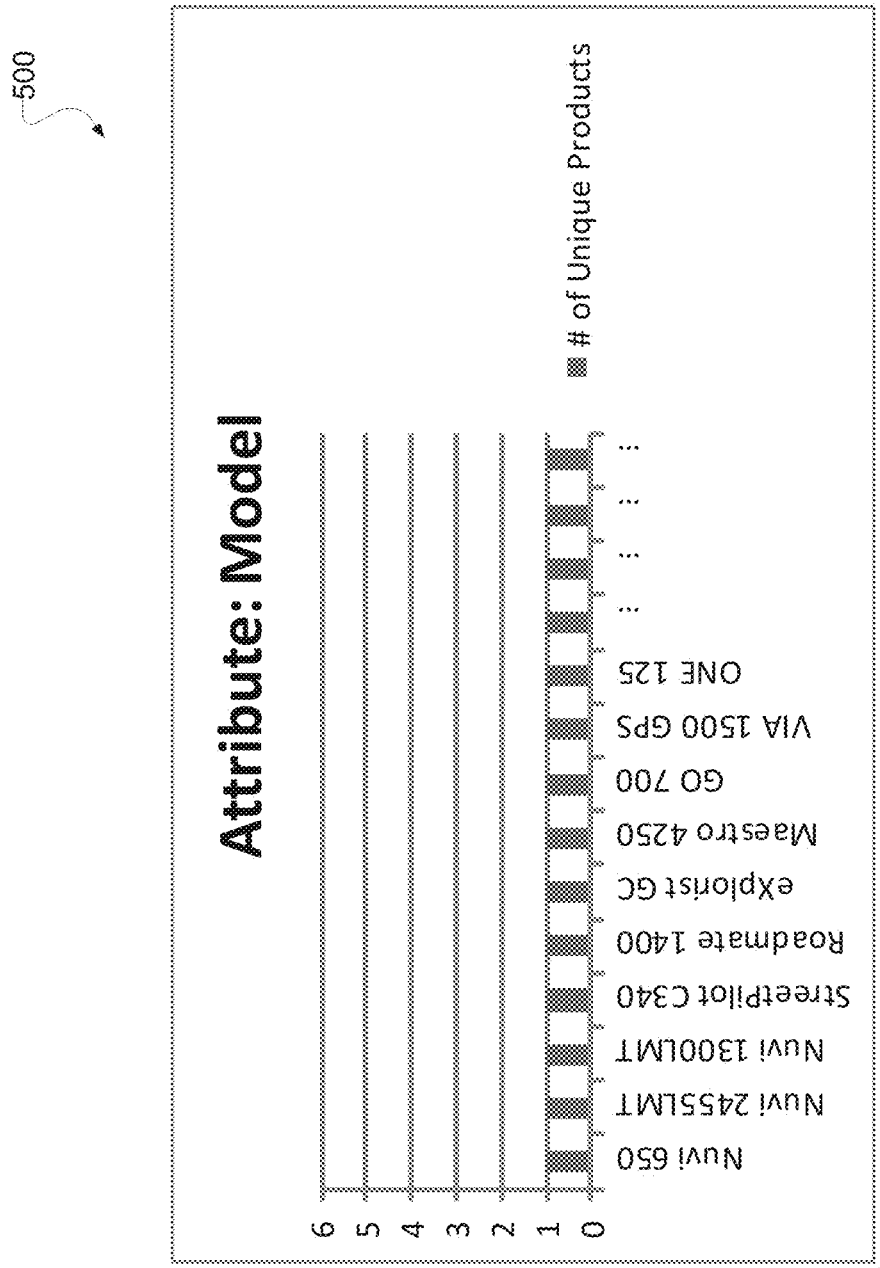
FIG. 5 illustrates an example of a histogram, according to various embodiments.

On the other hand, in the product category of "GPS", specific models such as "Nuvi 650", "eXplorist GC", and "VIA 1500 GPS" may tend to uniquely identify each product in a given category. For example, FIG. 5 illustrates a histogram 500 of the number of unique products in the product category of GPS that are associated with a given model attribute. As illustrated in FIG. 5, many of the products in this category have unique models, such that the knowledge of the model of a product item is very helpful in identifying the product item. Accordingly, the attribute of model has a high degree of variation, entropy, or distribution in value among the products in the GPS product category, since many products in that product category have unique models. Thus, the attribute ranking system 600 may assign a higher importance ranking to the attribute of model for this product category. Accordingly, for the GPS product category, the attribute ranking system 600 may rank the attribute of model as more important than the attributes of brand, color, and type.

Turning now to FIG. 6, the attribute ranking system 600 includes a determination module 602, a ranking module 604, and a database 606. The modules of the attribute ranking system 600 may be implemented on or executed by a single device such as an attribute ranking device, or on separate devices interconnected via a network. The aforementioned attribute ranking device may be, for example, one of the client machines (e.g. 110, 112) or application server(s) 118 illustrated in FIG. 1.

Figure 7:
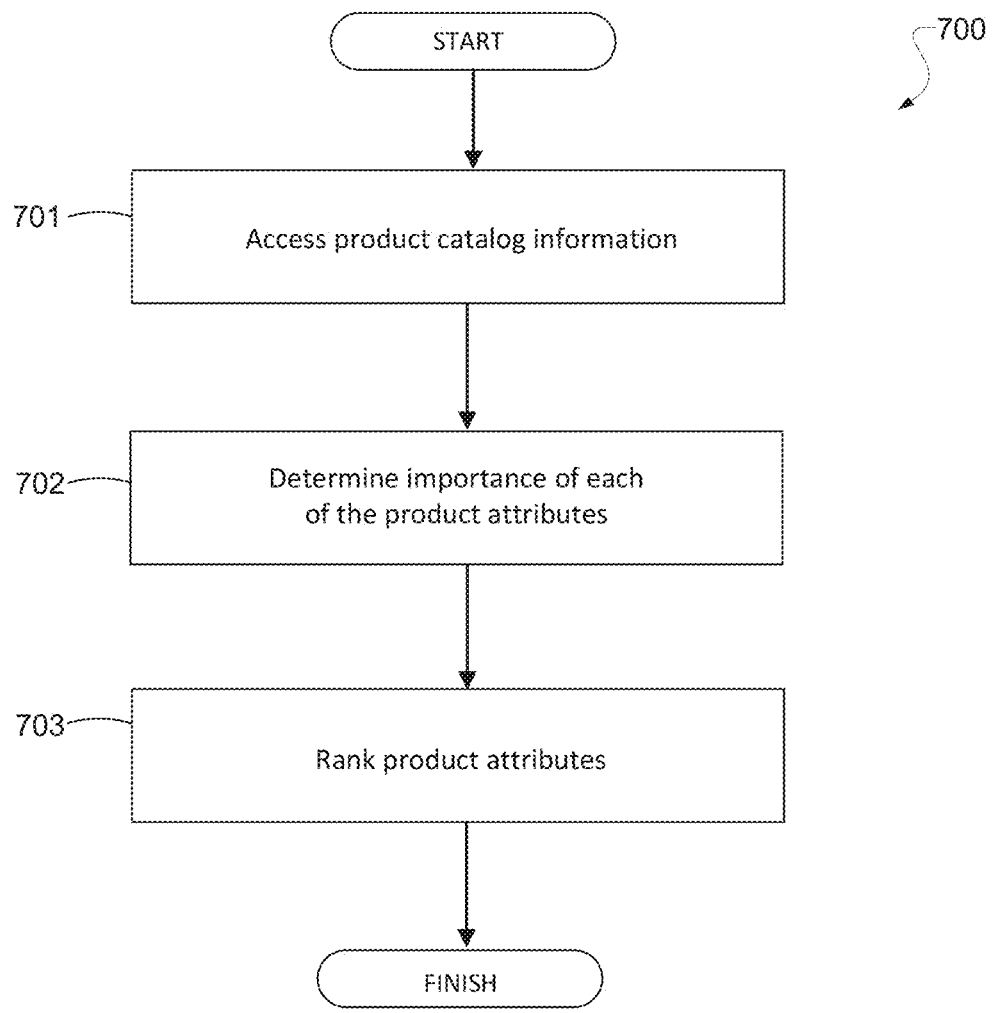
FIG. 7 is a flowchart illustrating an example method, according to various embodiments.

FIG. 7 is a flowchart illustrating an example method 700, according to various exemplary embodiments. The method 700 may be performed at least in part by, for example, the attribute ranking system 600 illustrated in FIG. 2 (or an apparatus having similar modules, such as client machines 110 and 112 or application server 118 illustrated in FIG. 1). In operation 701 in FIG. 7, the determination module 602 accesses product category information (e.g., product category information 200 and 300 in FIGS. 2 and 3) identifying various products in a given product category structure of a marketplace website (e.g., eBay). In some embodiments, the aforementioned product category information may identify a set of attributes associated with the products in the given product category (see FIGS. 2 and 3). Moreover, in some embodiments, the aforementioned product category information may identify various attribute values for each product in the given product category (see FIG. 3). In other words, each of the products in the given product category may have a specific value for each of the attributes associated with the given product category. The product category information illustrated in FIGS. 2 and 3 may be stored locally at, for example, the database 606 illustrated in FIG. 6, or may be stored remotely at a database, data repository, storage server, etc., that is accessible by the attribute ranking system 600 via a network (e.g., the Internet).

In operation 702 in FIG. 7, the determination module 602 determines the importance of each of the attributes for uniquely identifying the products in that product category. For example, the determination module 602 may determine a numerical importance value associated with each of the attributes, where the importance value indicates an importance of each of the attributes for uniquely identifying the products in that product category. According to various exemplary embodiments, the determination module 602 may determine the importance (or the importance value) for each of the attributes in the given product category by calculating the statistical variation, entropy, or distribution in the range of values of each attribute among the products in that product category. As understood by those skilled in the art, entropy is a statistical measure of "randomness" or "uncertainty" in a variable. In other words, the determination module 602 determines how many different values exist for a particular attribute among the products in a given product category. In some embodiments, attributes having a greater entropy value or greater statistical variation among the products in the given product category are associated with a greater importance value, whereas attributes having a smaller entropy value or smaller statistical variation among the products in the given product category are associated with a smaller importance value.

In operation 703 in FIG. 7, the ranking module 604 ranks each of the attributes associated with the products in a given product category, based on the importance of each of the attributes as determined in operation 702. In some embodiments, attributes having a greater importance value are ranked higher (indicating that are more important for uniquely identifying the products in the given product category) than attributes having a smaller importance value (indicating that they are less important for uniquely identifying the products in a given product category).

According to various exemplary embodiments, the attribute ranking system 600 enables a retailer or marketplace website to more easily and efficiently map item listings to specific backing products in the marketplace website's catalog. For example, the attribute ranking system may enable better mapping of item listings to particular eBay® backing products in the eBay® catalog.

For example, according to various exemplary embodiments, given the attribute rankings for various attributes (which may be generated as described above), the attribute ranking system 600 may map a given item listing to a backing product in a product category structure of a marketplace website. For example, given a user-supplied item listing title, and a product category, the item listing title will usually only include a small subset of all the possible attributes for the given category. But since the attribute ranking system 600 may determine the most important attributes for the given category (e.g., all the attributes having an importance value higher than a predetermined threshold, or the top X ranked attributes), the attribute ranking system 600 can focus on mapping the keywords in the item listing title to just these important attributes (as opposed to the entire set of attributes for that category), making it much more likely that the system can quickly, efficiently, and successfully map the item listing to a particular product.

For example, if a seller is trying to sell a computer, the seller may specify a product title such as "MacBook Pro 15 inch 2010". However, the product category information may specify large number of attributes for the product category of computer, such as model, display size, year, CPU, memory, hard disk space, Wi-Fi settings, graphics processor, operating system, and so on. If the attribute ranking system 600 determines that, for example, the most important attributes for the product category of computer are model, CPU, and display size, the attribute ranking system 600 may attempt to map the keywords in the product title "MacBook Pro 15 inch 2010" to the most important attributes for the product category, rather than all the attributes for the product category. Thus, the attribute ranking system 600 is much more likely to quickly, efficiently, and successfully map the item listing to a particular product.

Figure 8:
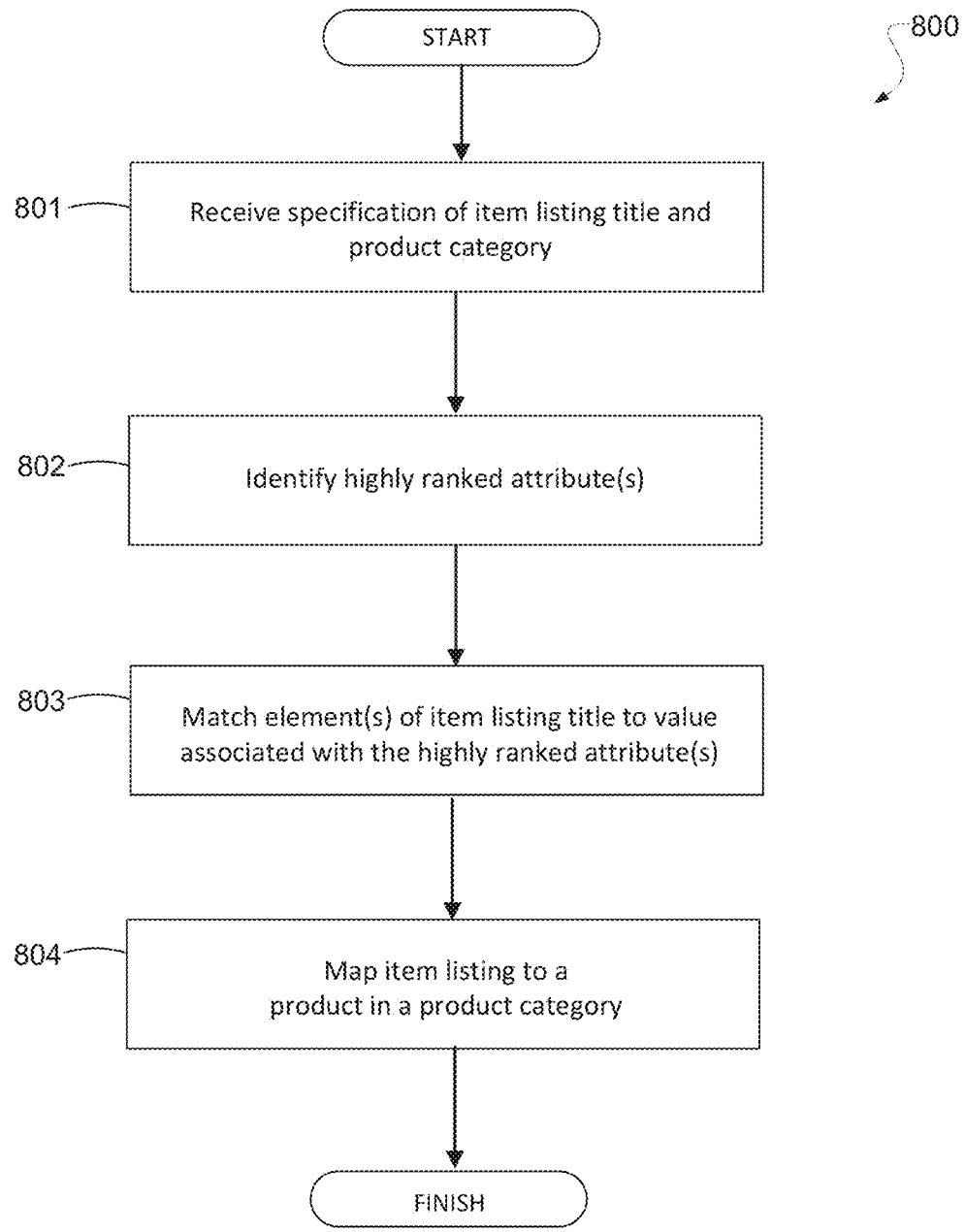
FIG. 8 is a flowchart illustrating an example method, according to various embodiments.

FIG. 8 is a flowchart illustrating an example method 800, consistent with various embodiments described above. The method 800 may be performed at least in part by, for example, the attribute ranking system 600 illustrated in FIG. 2 (or an apparatus having similar modules, such as client machines 110 and 112 or application server 118 illustrated in FIG. 1). In operation 801 in FIG. 8, the ranking module 604 receives a user specification of an item listing title and a product category in connection with a user request to post an item listing on a marketplace website. For example, when a seller wishes to sell an item on the marketplace website (e.g., eBay), the marketplace website may display a user interface configured to receive a user specification of the item listing title and the product category. An example of an item listing title and a product category is the item listing title of "MacBook Pro 15 inch 2010" and the product category of "Computers". In operation 802 in FIG. 8, the ranking module 604 identifies one or more highly ranked attributes for the product category specified by the user in operation 801. For example, the ranking module 604 may identify a subset of the ranked attributes for the specified product category (e.g., where the attributes may have been ranked in operation 704 in FIG. 7) that each have at least a predetermined ranking (e.g., the top X attributes). For instance, for the product category of "computer", the ranking module 604 may identify the attributes of model, CPU, and display size as highly ranked attributes in this product category. In operation 803 in FIG. 8, the ranking module 604 matches elements of the item listing title specified by the user in operation 801 to values associated with the highly ranked attributes identified in operation 802. For example, the ranking module 604 may match the term "MacBook Pro" to the highly ranked attribute of "model", and the term "15 inch" to the highly ranked attribute of "display size", and so on. In operation 804 in FIG. 8, the ranking module 604 maps the item listing to one of the products in the product category in the inventory, based on the values matched in operation 803. For example, the ranking module 604 may associate the item listing with the user-specified title "MacBook Pro 15 inch 2010" with the appropriate computer product in the product category of "Computers". Accordingly, various predetermined information (e.g., product picture, a product description, suggested product price, etc.) associated with the appropriately matched product may be automatically imported into the item listing being generated by the seller.

According to various exemplary embodiments, the attribute ranking system 600 may display a user interface to a seller seeking to generate an item listing, where the user interface allows the seller to specify a product category for the item being listed. After the seller specifies a product category, the user interface may display entry fields for the most important attributes for the selected category (e.g., all the attributes having an importance value higher than a predetermined threshold, or the top X ranked attributes). The user can then input information into the entry fields, either by manual text entry, or by selecting from predefined inputs included in pull-down menus associated with the entry fields, and so on. Based on the received attribute values for the most important attributes for the specified product category, the attribute ranking system 600 may infer—with a high probability of success—the particular product item that the seller is trying to sell in the item listing, and the system can associate the item listing with this particular product item. Accordingly, the seller is not forced to enter an item listing title or all the possible attribute values available for the corresponding product category.

Figure 9:
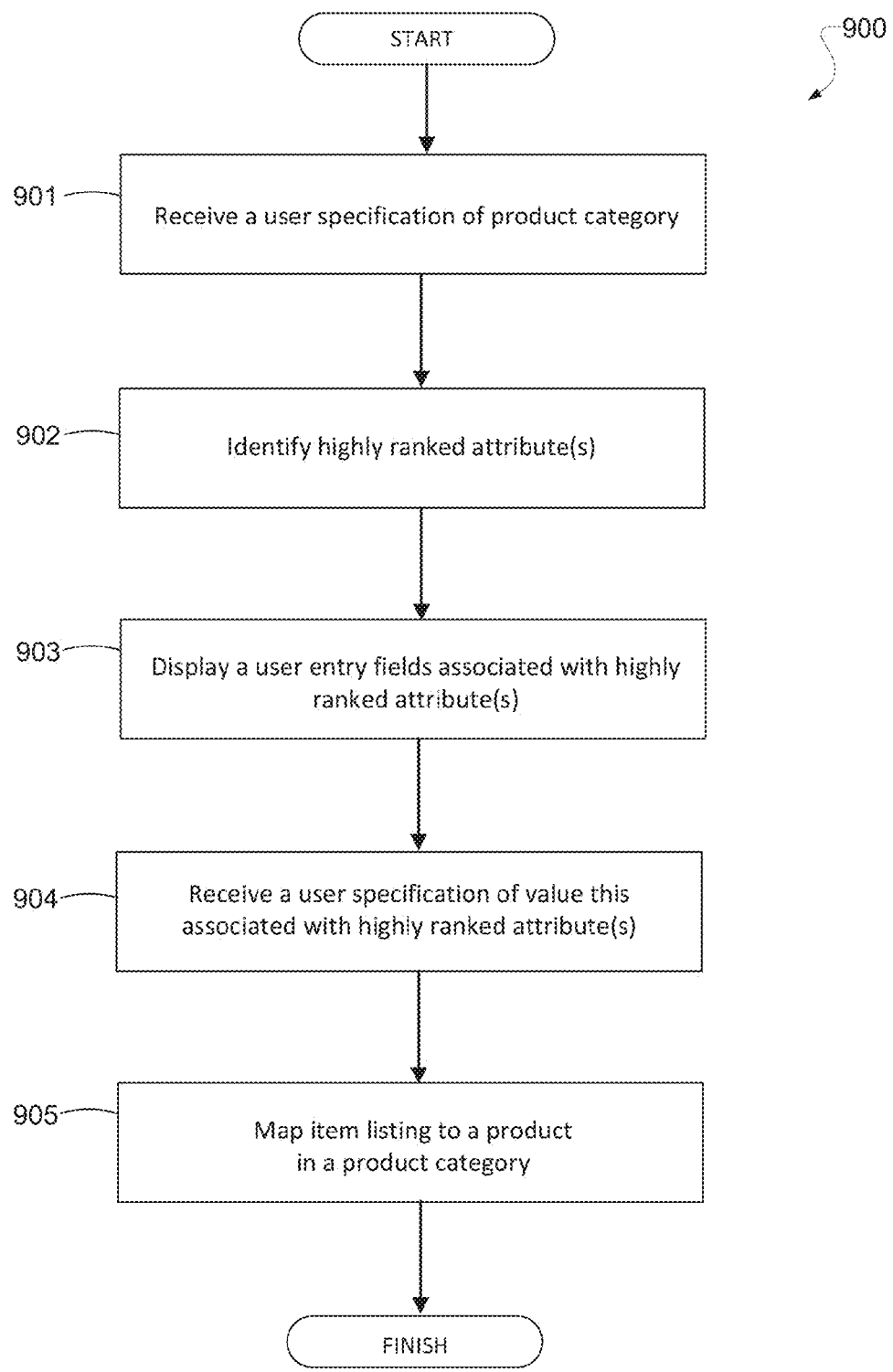
FIG. 9 is a flowchart illustrating an example method, according to various embodiments.

FIG. 9 is a flowchart illustrating an example method 900, consistent with various embodiments described above. The method 900 may be performed at least in part by, for example, the attribute ranking system 600 illustrated in FIG. 2 (or an apparatus having similar modules, such as client machines 110 and 112 or application server 118 illustrated in FIG. 1). In operation 901 in FIG. 9, the ranking module 604 receives, via a user interface, a user specification of a product category in connection with a user request to post an item listing on a marketplace website. For example, when a seller wishes to sell an item on the marketplace website (e.g., eBay), the marketplace website may display a user interface configured to receive a user specification of the product category. For example, as illustrated in FIG. 10A, the ranking module 604 may display a user interface 1000 configured to receive a user specification of a product category such as "Computer". In operation 902 in FIG. 9, the ranking module 604 identifies one or more highly ranked attributes for the product category specified by the user in operation 901. For example, the ranking module 604 may identify a subset of the ranked attributes for the specified product category (e.g., where the attributes may have been ranked in operation 704 in FIG. 7) that each have at least a predetermined ranking (e.g., the top X attributes). For example, for the product category of "Computer", the ranking module 604 may identify the attributes of model, CPU, and display size as highly ranked attributes in this product category. In operation 903 in FIG. 9, the ranking module 604 displays, via the user interface, user interface entry fields configured to receive a user specification of a value associated with each of the highly ranked attributes of the given product category that was identified in operation 902. For example, as illustrated in FIG. 10A, the ranking module 604 may display a user interface 1000 including user interface entry fields configured to receive a user specification of a value associated with the highly ranked attributes of model, CPU, and display size. In operation 904 in FIG. 9, the ranking module 604 receives, via the user interface, the user specification values associated with the highly ranked attributes (see FIG. 10A). In operation 905 in FIG. 9, the ranking module 604 maps the item listing to one of the products in the specified product category, based on the value specified by the user in operation 904. For example, the ranking module 604 may associate the user-specified values of "model 1", "display size 2", and "CPU 3" (which may have been entered via the user interface 1000 in FIG. 10A), with a particular product "XYZ computer" in the product category of "Computer". In some embodiments, 600 may display the prompt 1001 in FIG. 10B to notify the user of the matching product(s) and to request user confirmation of the matching product(s). Accordingly, various predetermined information (e.g., product picture, a product description, suggested product price, etc.) associated with the appropriate matching product may be automatically imported into the item listing being generated by the seller.

In some embodiments, when the user attempts to generate an item listing, it is possible that the user does not specify a category of the item listing. Thus, the attribute ranking system 600 may try to compare information included in the seller supplied description or title with attribute values for all possible attributes in all possible categories. However, since the attribute ranking system 600 can determine the most important attributes for each product category, it is possible that the attribute ranking system 600 may compare the information included in the seller supplied description or title with just attribute values for the most important attributes in all the categories. Thus, consistent with various embodiments described throughout, the attribute ranking system 600 may map an item listing to a particular backing product, in a far more efficient manner than previously possible.

Example Mobile Device

Figure 11:
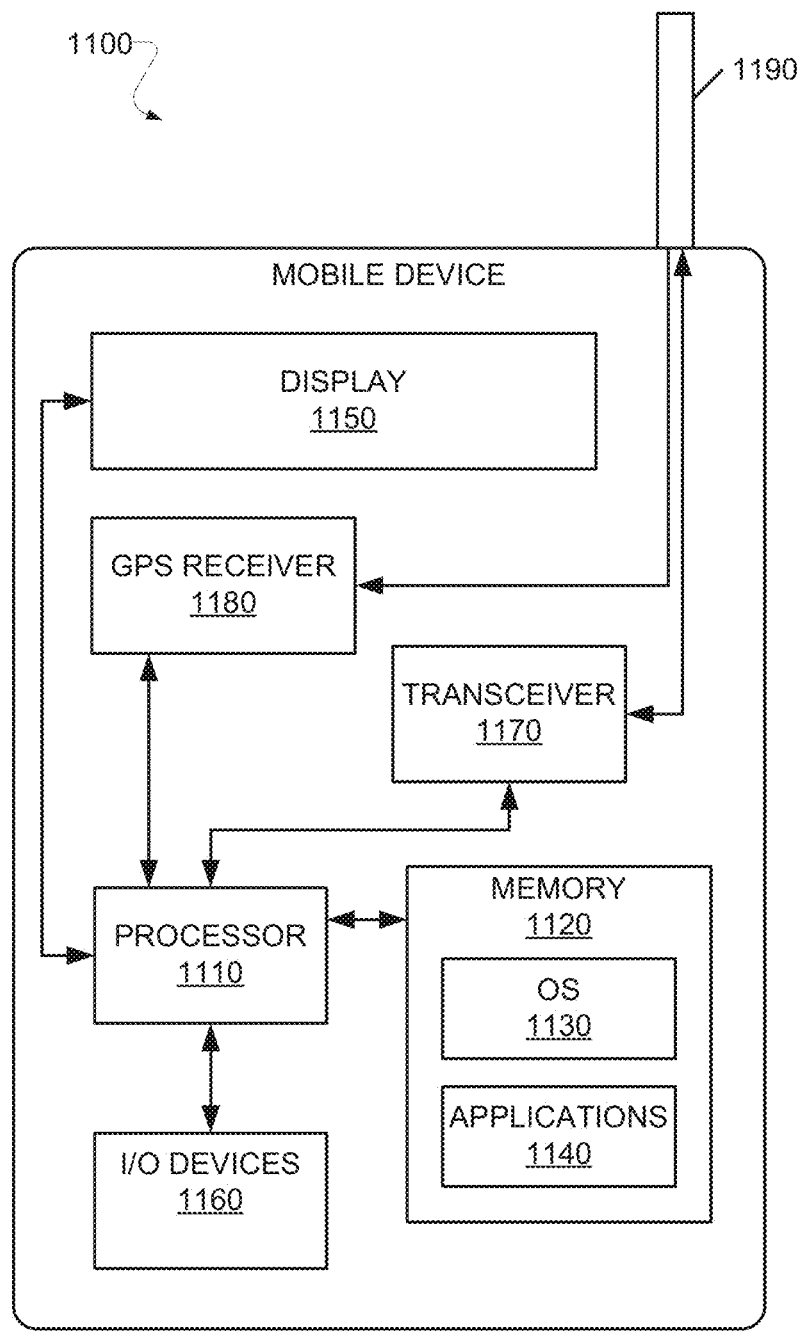
FIG. 11 illustrates an example of a mobile device, according to various embodiments.

FIG. 11 is a block diagram illustrating the mobile device 1100, according to an example embodiment. The mobile device may correspond to, for example, client machines 110 and 112 or application server 118 illustrated in FIG. 1. One or more of the modules of the system 200 illustrated in FIG. 2 may be implemented on or executed by the mobile device 1100. The mobile device 1100 may include a processor 1110. The processor 1110 may be any of a variety of different types of commercially available processors suitable for mobile devices (for example, an XScale architecture microprocessor, a Microprocessor without Interlocked Pipeline Stages (MIPS) architecture processor, or another type of processor). A memory 1120, such as a Random Access Memory (RAM), a Flash memory, or other type of memory, is typically accessible to the processor 1110. The memory 1120 may be adapted to store an operating system (OS) 1130, as well as application programs 1140, such as a mobile location enabled application that may provide location based services to a user. The processor 1110 may be coupled, either directly or via appropriate intermediary hardware, to a display 1150 and to one or more input/output (I/O) devices 1160, such as a keypad, a touch panel sensor, a microphone, and the like. Similarly, in some embodiments, the processor 1110 may be coupled to a transceiver 1170 that interfaces with an antenna 1190. The transceiver 1170 may be configured to both transmit and receive cellular network signals, wireless data signals, or other types of signals via the antenna 1190, depending on the nature of the mobile device 1100. Further, in some configurations, a GPS receiver 1180 may also make use of the antenna 1190 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
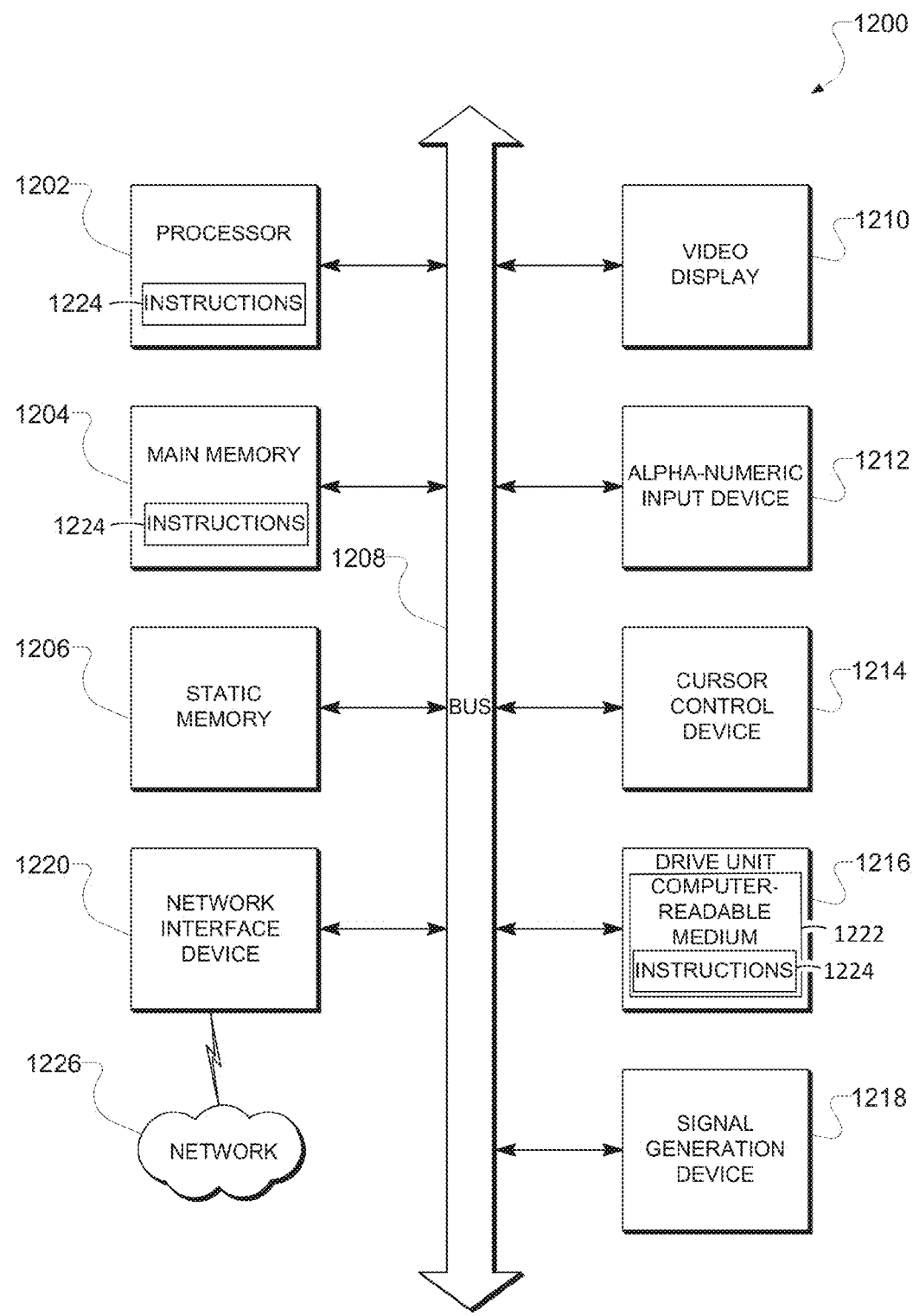
FIG. 12 is a diagrammatic representation of a machine in the example form of a computer system within which a set of instructions, for causing the machine to perform any one or more of the methodologies discussed herein, may be executed.

FIG. 12 is a block diagram of machine in the example form of a computer system 1200 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:

accessing product category information identifying various products in a particular product category in an inventory of a network database, the product category information further identifying a set of attributes associated with the products in the particular product category;

calculating, using one or more processors, an importance value associated with each of the attributes; the importance values indicating an importance of each of the attributes for uniquely identifying the products in the product category, attributes having a greater statistical variation among the products in the product category being associated with a greater importance value, attributes having a smaller statistical variation among the products in the product category being associated with a smaller importance value;

ranking the attributes, based on the importance value associated with each of the attributes;

transmitting, from a server over a network, instructions to cause a client machine to generate a user interface that is configured to display one or more user interface entry fields;

receiving, at the server over the network, a user specification of a product category in connection with a user request to post an item listing and a user specification of one or more values associated with one or more of a subset of the ranked attributes;

identifying the subset of the ranked attributes from the network database, based on the receiving of the user specifications, each ranked attribute having at least a predetermined ranking; and mapping the item listing to one of the products in the product category in the inventory of the network database, based on the user specified values.

2. The method of claim 1, wherein each of the products in the product category is associated with a specific value for each of the attributes.

3. The method of claim 1, wherein the calculating comprises determining, for each of the attributes, an entropy value or a statistical variation associated with a range of values of the attribute among the products in the product category.

4. The method of claim 1, further comprising:

receiving a user specification of an item listing title and the product category in connection with a user request to post an item listing on the marketplace website;

identifying a subset of the ranked attributes that each have at least a predetermined ranking;

matching at least one element of the item listing title to a value associated with at least one of the subset of the ranked attributes; and mapping the item listing to one of the products in the product category in the inventory, based on the matched value.

5. A system comprising:

one or more processors and executable instructions accessible on a computer-readable medium that, when executed, cause the one or more processors to perform operations comprising:

accessing product category information identifying various products in a particular product category in an inventory of a network database, the product category information further identifying a set of attributes associated with the products in the particular product category;

calculating an importance value associated with each of the attributes, the importance values indicating an importance of each of the attributes for uniquely identifying the products in the product category, attributes having a greater statistical variation among the products in the product category being associated with a greater importance value, attributes having a smaller statistical variation among the products in the product category being associated with a smaller importance value;

ranking the attributes; based on the importance value associated with each of the attributes;

transmitting, from a server over a network, instructions to cause a client machine to generate a user interface that is configured to display one or more user interface entry fields;

receiving, at a server over a network, a user specification of a product category in connection with a user request to post an item listing and a user specification of one or more values associated with one or more of the subset of the ranked attributes;

identifying a subset of the ranked attributes from the network database, based on the receiving of the user specifications, each ranked attribute having at least a predetermined ranking; and mapping the item listing to one of the products in the product category in the inventory of the network database, based on the user specified values.

6. The system of claim 5, wherein each of the products in the product category is associated with a specific value for each of the attributes.

7. The system of claim 5, wherein the calculating comprises determining, for each of the attributes, an entropy value or a statistical variation associated with a range of values of the attribute among the products in the product category.

8. The system of claim 5, wherein the operations further comprise:

receiving a user specification of an item listing title and the product category in connection with a user request to post an item listing on the marketplace website;

identifying a subset of the ranked attributes that each have at least a predetermined ranking;

matching at least one element of the item listing title to a value associated with at least one of the subset of the ranked attributes; and mapping the item listing to one of the products in the product category in the inventory, based on the matched value.

9. A non-transitory machine-readable storage medium comprising instructions that, when executed by one or more processors of a machine; cause the machine to perform operations comprising:

accessing product category information identifying various products in a particular product category in an inventory of a network database, the product category information further identifying a set of attributes associated with the products in the particular product category;

calculating an importance value associated with each of the attributes, the importance values indicating an importance of each of the attributes for uniquely identifying the products in the product category, attributes having a greater statistical variation among the products in the product category being associated with a greater importance value, attributes having a smaller statistical variation among the products in the product category being associated with a smaller importance value;

ranking the attributes, based on the importance value associated with each of the attributes;

transmitting, from a server over a network, instructions to cause a client machine to generate a user interface that is configured to display one or more user interface entry fields;

receiving, at a server over a network, a user specification of a product category in connection with a user request to post an item listing and a user specification of one or more values associated with one or more of the subset of the ranked attributes;

identifying a subset of the ranked attributes from the network database, based on the receiving of the user specifications, each ranked attribute having at least a predetermined ranking; and mapping the item listing to one of the products in the product category in the inventory of the network database, based on the user specified values.

10. The storage medium of claim 9, wherein each of the products in the product category is associated with a specific value for each of the attributes.

11. The storage medium of claim 9, wherein the calculating comprises determining, for each of the attributes, an entropy value or a statistical variation associated with a range of values of the attribute among the products in the product category.

12. The storage medium of claim 9, wherein the operations further comprise:

receiving a user specification of an item listing title and the product category in connection with a user request to post an item listing on the marketplace website;

identifying a subset of the ranked attributes that each have at least a predetermined ranking;

matching at least one element of the item listing title to a value associated with at least one of the subset of the ranked attributes; and mapping the item listing to one of the products in the product category in the inventory, based on the matched value.

* * * * *

UNITED STATES PATENT AND TRADEMARK OFFICE
CERTIFICATE OF CORRECTION

PATENT NO. : 9,760,932 B2  
APPLICATION NO. : 14/081138  
DATED : September 12, 2017  
INVENTOR(S) : Ming Liu et al.

Page 1 of 1

It is certified that error appears in the above-identified patent and that said Letters Patent is hereby corrected as shown below:

In the Claims

Column 13, Line 10, Claim 1, delete "attributes;" and insert -- attributes, --, therefor.

Column 14, Line 12, Claim 5, delete "attributes;" and insert -- attributes, --, therefor.

Column 14, Line 53, Claim 9, delete "machine;" and insert -- machine, --, therefor.

Signed and Sealed this  
Sixth Day of March, 2018

Andrei Iancu  
*Director of the United States Patent and Trademark Office*